S. L. PLUMB.
Device for Separating Cream from Milk.
No. 208,846.                    Patented Oct. 8, 1878.
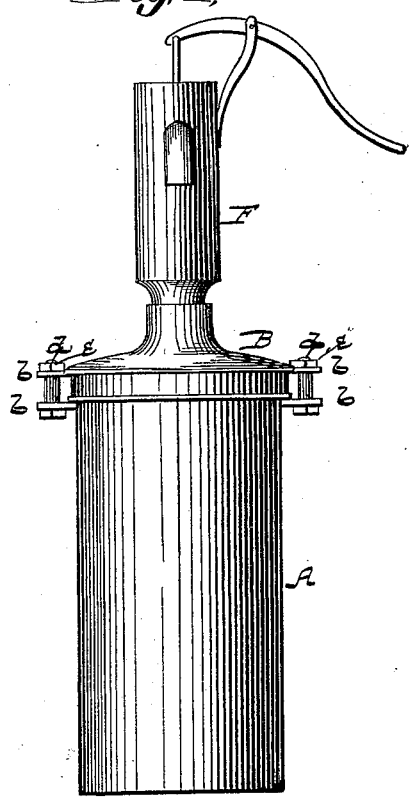
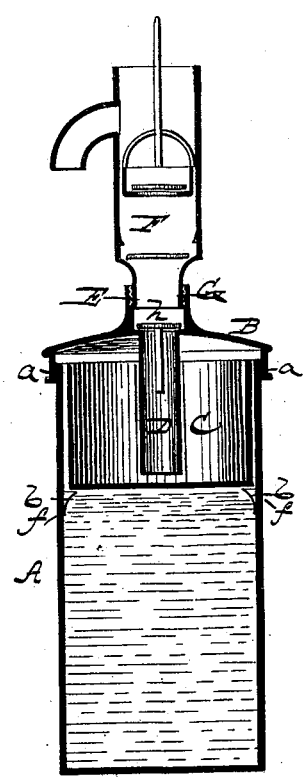

UNITED STATES PATENT OFFICE.

SHERMAN L. PLUMB, OF PORTAGE, WISCONSIN, ASSIGNOR TO HIMSELF AND WILLIAM BARD.

IMPROVEMENT IN DEVICES FOR SEPARATING CREAM FROM MILK.

Specification forming part of Letters Patent No. 208,846, dated October 8, 1878; application filed August 29, 1878.

*To all whom it may concern:*

Be it known that I, SHERMAN L. PLUMB, of Portage, State of Wisconsin, have invented certain new and useful Improvements in Devices for Raising Cream on Milk; and I do hereby declare that the following is a full, clear, and exact description thereof, reference being had to the accompanying drawings, and to the letters of reference marked thereon, which form part of this specification.

The nature of my invention consists in the construction and arrangement of a device for extracting cream from milk by a vacuum, as will be hereinafter more fully set forth.

In order to enable others skilled in the art to which my invention appertains to make and use the same, I will now proceed to describe its construction and operation, referring to the annexed drawings, in which—

Figure 1 is a side elevation, and Fig. 2 a central vertical section, of my improved apparatus.

A represents a milk-can of any suitable dimensions, provided with the lid or cover B, fitting tightly thereon. A rubber gasket or packing, *a*, is interposed between the can and cover to make the joint air-tight; and both the can and cover are provided with lugs *b b*, through which are passed bolts *d d*, and nuts *e e* screwed on the ends of said bolts to make the parts perfectly tight.

Inside of the can A are suitable lugs *f f*, to support a water-pan, C, in the upper part of the can.

The lid B is provided with a central tube, D, which extends downward nearly to the bottom of the pan C, and on top of the lid is attached a screw-collar, E, the tube D extending down from the center of this collar, as shown.

F represents a pump of any suitable construction, provided at its lower end with a screw-neck, G, to be screwed into the collar E, and thus form the connection with the lid B. In the collar E is placed a valve, *h*, closing the upper end of the tube D.

The operation of the device is as follows: The can A is filled with milk nearly to the lugs *f f*, and then the pan C is inserted and nearly filled with water. The cover B is then put on and fastened down tightly, after which the pump F is screwed on. By now pumping the water out of the pan C, through the tube D, a vacuum is formed in the can above the milk, and by this means all the cream is rapidly drawn to the surface of the milk.

The pump can be unscrewed to be used on another can, if necessary, the vacuum being retained by means of the valve *h*. The water-pan may be used outside of the milk-vessel, if desired, or a portion of the milk may be withdrawn to form the vacuum.

The device as constructed is very simple and cheap and not liable to get out of order.

Having thus fully described my invention, what I claim as new, and desire to secure by Letters Patent, is—

1. In a process or mode of liberating cream from milk, the formation of a vacuum in a closed can containing the milk by means of a pump removing a body of water placed in a pan above the milk within the can, substantially as described.

2. The combination of a milk-can, A, having air-tight lid B, the interior water-pan C, tube D, and collar E, connected to the lid, the valve *h*, and the removable pump F, substantially as and for the purposes herein set forth.

In testimony that I claim the foregoing as my own I affix my signature in presence of two witnesses.

SHERMAN L. PLUMB.

Witnesses:
N. J. CURRIER,
W. H. C. ABELL.